United States Patent
Henrici et al.

(10) Patent No.: US 11,536,441 B2
(45) Date of Patent: Dec. 27, 2022

(54) OVEN LIGHT WITH AXIAL LOCKING MECHANISM

(71) Applicant: BJB GmbH & Co. KG, Arnsberg (DE)

(72) Inventors: Philipp Henrici, Arnsberg (DE); Olaf Baumeister, Sundern (DE); Robert Buhl, Arnsberg (DE)

(73) Assignee: BJB GmbH & Co. KG, Arnsberg (DE)

(*) Notice: Subject to any disclaimer, the term of this patent is extended or adjusted under 35 U.S.C. 154(b) by 0 days.

(21) Appl. No.: 17/721,678

(22) Filed: Apr. 15, 2022

(65) Prior Publication Data
US 2022/0373164 A1   Nov. 24, 2022

(30) Foreign Application Priority Data
May 18, 2021 (DE) .......................... 102021112800.5

(51) Int. Cl.
  *F21V 17/10* (2006.01)
  *A21B 3/10* (2006.01)
  *F24C 15/00* (2006.01)

(52) U.S. Cl.
  CPC .............. *F21V 17/10* (2013.01); *A21B 3/10* (2013.01); *F24C 15/008* (2013.01)

(58) Field of Classification Search
  CPC ........... F21V 17/10; A21B 3/10; F24C 15/008
  See application file for complete search history.

(56) References Cited

U.S. PATENT DOCUMENTS

| | | | |
|---|---|---|---|
| 2007/0165415 A1* | 7/2007 | Henrici | F21V 17/14 362/457 |
| 2011/0149552 A1 | 6/2011 | Atalay | |
| 2016/0201882 A1 | 7/2016 | Liu et al. | |

FOREIGN PATENT DOCUMENTS

| | | |
|---|---|---|
| DE | 102014006385 A1 | 11/2014 |
| DE | 112009002252 B4 | 6/2018 |
| EP | 1505351 A2 | 2/2005 |
| EP | 1811227 A1 | 7/2007 |

* cited by examiner

Primary Examiner — Anne M Hines
(74) Attorney, Agent, or Firm — Von Rohrscheidt Patents

(57) ABSTRACT

A cooking appliance light including a light glass arranged at a top side of the cooking appliance light; a socket arranged at a bottom side of the cooking appliance light, wherein a geometric center axis of the cooking appliance light runs vertically through the socket; a neck arranged at a bottom side of the light glass, the neck including at least one groove arrangement including an axially extending vertical groove and an adjoining circumferentially extending horizontal groove wherein the axially extending vertical groove and the circumferentially extending horizontal groove are radially open and engageable by a locking bar, wherein the axially extending vertical groove includes an axially oriented locking bar entry opening, wherein the circumferentially extending horizontal groove includes an axially upward oriented locking bar support surface including a safety protrusion and a movement stop at an end that is distal from the axially extending vertical groove.

8 Claims, 8 Drawing Sheets

OVEN LIGHT WITH AXIAL LOCKING MECHANISM

RELATED APPLICATIONS

This application claims priority from German Patent Application DE 10 2021 112 800.5 filed on May 18, 2021 which is incorporated in its entirety by this reference.

FIELD OF THE INVENTION

The invention relates to a cooking appliance light, in particular an oven light.

BACKGROUND OF THE INVENTION

Cooking appliance lights are configured to illuminate a cooking cavity of cooking appliances in order to observe a cooking material during a cooking process and to assess a cooking condition.

Cooking appliances are subjected to cooking vapors or waste steam spreading in the cooking cavity while preparing foods. Furthermore, in particular when dealing with ovens or steam cookers high temperatures prevail in the cooking cavities. In so called pyrolysis ovens these temperatures can be up to 450 degrees C. Ovens in commercial kitchens can reach cooking temperature of 500 degrees C.

Though LED illuminants are used more and more in ovens traditional filament bulbs are still being widely used. This is partially due to established production techniques. Cooking appliance lights of this type are proven in production and in applications and are comparatively economical. On the other hand, there are technical reasons that favor the use of traditional illuminants. Cooking cavity temperatures are very significant in this respect in that they reduce a service life of illuminants that are sensitive to high temperatures.

Also other problems of traditional cooking appliance lights like e.g. baking, caking and sticking the light cover glass at the socket were solved. Thus, e.g. EP 1 811 227 A1 shows a generic cooking appliance light. In this cooking appliance light, the socket is fixed in an assembly recess of the cooking cavity wall and includes a filament with the widely used G9 socket. The light glass is fixed at the socket by a rotating insertion movement similar to a bayonet closure, wherein an essentially radially acting spring elastic locking bar assures a reliably disengagable fixing of the light glass at the socket.

Thus, the neck of the light glass includes different slanted surfaces within the horizontal groove that are formed into the glass and which partially assure a linear or punctiform contact of the radially acting locking bar in order to prevent an adhesion between locking bar and light glass caused by baking and caking. The locking bar configured as spring elastic tongue has a particular configuration and assures an axial clearance in conjunction with the horizontal groove at room temperature. This prevents a baking induced adhesion of the light glass at the socket flange. This advantageous cooking appliance light is comparatively complex and difficult to produce due to the slanted surfaces to be precisely formed in the neck of the light and the particular configuration of the radially acting locking bars.

BRIEF SUMMARY OF THE INVENTION

Thus, it is an object of the invention to provide a cooking appliance light or oven light that is protected against an adhesion of the light glass through baking and that has a different configuration that is easier to produce.

The object is achieved by a cooking appliance light including a light glass arranged at a top side of the cooking appliance light; a socket arranged at a bottom side of the cooking appliance light, wherein a geometric center axis of the cooking appliance light runs vertically through the socket; a neck arranged at a bottom side of the light glass, the neck including at least one groove arrangement including an axially extending vertical groove and an adjoining circumferentially extending horizontal groove wherein the axially extending vertical groove and the circumferentially extending horizontal groove are radially open and engageable by a locking bar, wherein the axially extending vertical groove includes an axially oriented locking bar entry opening, wherein the circumferentially extending horizontal groove includes an axially upward oriented locking bar support surface including a safety protrusion and a movement stop at an end that is distal from the axially extending vertical groove; an attachment bracket forming the locking bar that is fixed at the socket and that radially engages the groove arrangement after performing an insertion and rotation movement so that the light glass is attached at the socket; and a contact flange that is part of the socket and in contact with the light glass, wherein the attachment bracket includes a spring arrangement that supports the locking bar; wherein the locking bar includes an axially downward oriented locking bar surface that contacts the axially upward oriented locking bar support surface, wherein the spring arrangement imparts an axially downward force upon the light glass that retains the light glass at the contact flange.

The essential advantage of the oven light according to the invention is found in the configuration of locking bars that supports the light glass at the socket. The light glass engages the horizontal groove radially, however axially oriented surfaces of the horizontal groove and of the locking bar cooperate so that forming radially oriented slanted surfaces at a neck of the light glass can be omitted.

The spring elastic deformation in the axial direction caused by the cooperation of locking bar and spring element and the axially oriented spring forces caused by fixing the light glass support the light glass reliably at the contact flange at the socket and assure a simple disengagement of the light glass when the lamp retained in the socket has to be replaced.

In a particularly advantageous embodiment, the locking bar forms a support cam that protrudes axially relative to the locking bar support surface.

Thus, only the support cam of the locking bar interacts with the locking bar support surface of the horizontal groove so that an essentially punctiform contact surface is provided between the locking bar and the locking bar support surface. This reduces the risk of baking and seizing the locking bar at the locking bar support surface of the horizontal groove.

Thus, the support cam can be produced e.g; as an embossing in the locking bar formed from a piece of sheet metal.

It is furthermore advantageously provided
that the safety protrusion is a step that rises upward in an axial direction, and
that the bar is provided with slanted surfaces at horizontally oriented ends, wherein the slanted surfaces are oriented towards the locking bar support surface and sloped downward towards the locking bar support surface.

In this embodiment, a lift over movement over the safety protrusion is imparted upon the locking bar during the inserting twist movement in order to fix the light glass in the socket. This lift over movement occurs during the rotation of the light glass. Thus, an uncontrolled backward rotation can be prevented by the safety protrusion. The slanted surfaces formed by the locking bar facilitate the lift over movement since the slanted surfaces slide down on the safety protrusion.

Furthermore, a spring arm forms part of the attachment element and supports the locking bar at its first end and is attached with its second end at a leaf spring and the leaf spring deflects axially while building up a spring tension and facilitates an axial displacement of the locking bar arranged at the spring arm.

The leaf spring facilitates an additional axial displacement of the locking bar and facilitates compensating for fabrication tolerances that extend the socket body or the neck of the light glass in the axial direction.

The axial movability of the locking bar augmented by the leaf spring facilitates placing a gasket, friction reducing material or similar between the contact flange of the socket and the light glass without having to adapt the cooking appliance light with respect to its design. Thus, the oven light can be used as desired by a manufacturer without requiring adaptation. Thus, it is also possible to provide a gasket between the light glass and the contact flange or use the same cooking appliance light without a seal.

Furthermore, the socket forms an annular wall protruding from a horizontally oriented socket base wherein the horizontal wall defines a receiving cavity and includes at least one receiving groove for a spring arm of the attachment element wherein the spring arm is inserted into the receiving groove with a radial clearance.

The facilitated radial clearance of the spring arm is an additional factor to facilitate axial clearance in the design. When the axial displacement of the leaf spring is exhausted, radial expansion of the spring arms facilitates easy sliding of the horizontally deflected locking bars and thus a slanting of the locking bars. This provides another option to gain a small amount of axial clearance in the connection between socket and light glass.

An advantageous embodiment of the invention is characterized in that the leaf spring, the spring arm and the locking bar form a spring arrangement made from a spring elastic sheet metal including a radially oriented and axially spring elastic and deflecting leaf spring, a radially oriented and axially spring elastic and deflecting locking bar, and optionally an axially oriented and radially deflecting spring arm.

Furthermore, the attachment element is fixed at the socket by the leaf spring, in particular when the leaf spring is part of a ring that is arranged within the receiving cavity and fixed at the annular wall or the socket base.

BRIEF DESCRIPTION OF THE DRAWINGS

Further advantages of the invention can be derived from the subsequent description of an embodiment with reference to drawing figures, wherein.

DETAILED DESCRIPTION OF THE INVENTION

Figure 1:
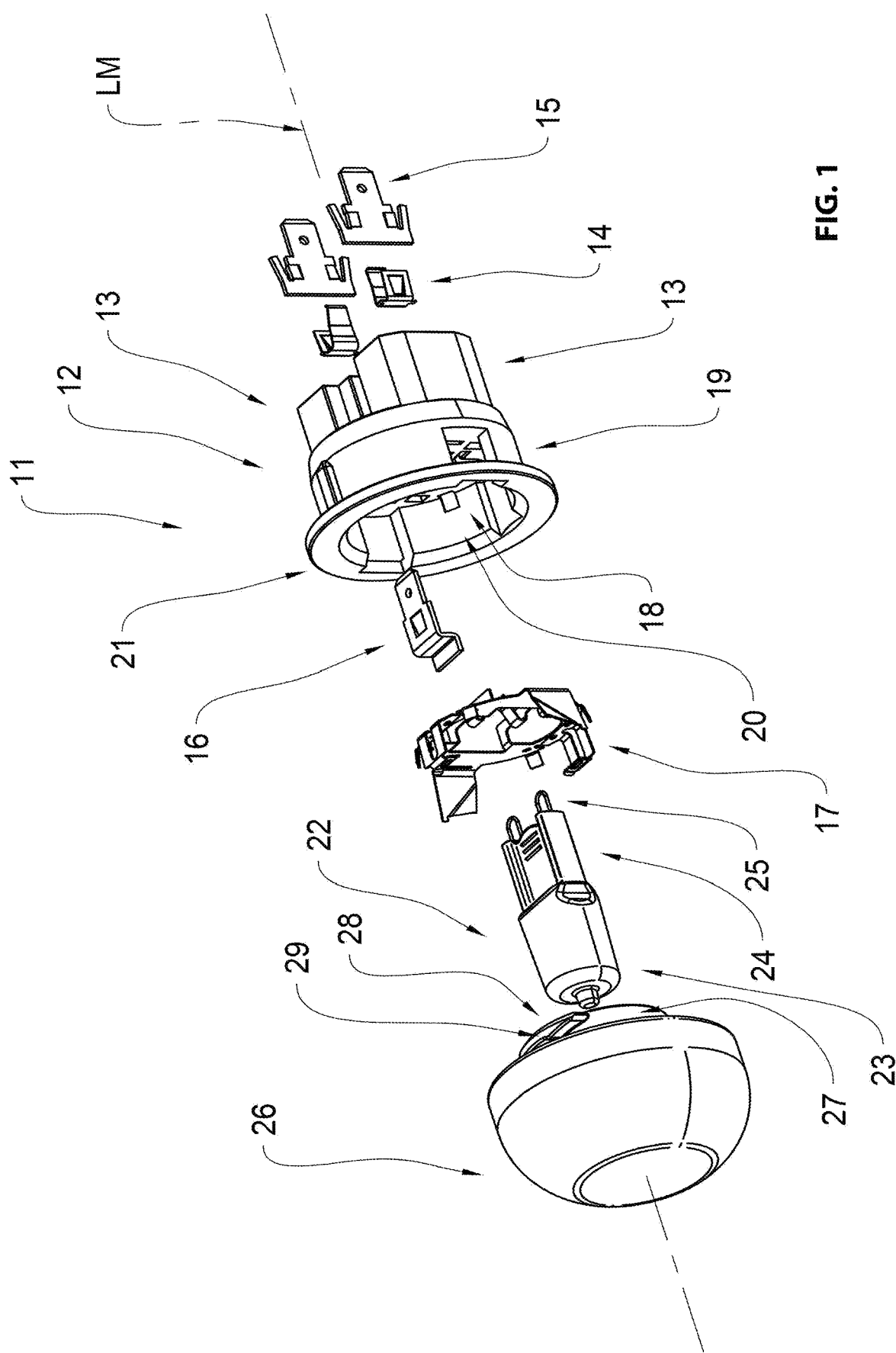
FIG. 1 illustrates an exploded view of a cooking appliance lamp according to the invention.

A cooking appliance light configured as an oven light is designated in the drawing figures overall with reference numeral 10.

The oven light 10 includes a lamp socket 11 whose socket base 12 supports a respective socket contact 14 and a connection contact 15 at two stand offs 13 arranged at a bottom side.

The socket base 12 thus receives a protective conductor contact 16 and supports an attachment ring 17 in a receiving cavity 18 that is formed by an annular wall 19 that supports a retaining flange 21 at an end that envelops its insertion opening 20.

The oven light 10 furthermore includes a lamp 22 that is formed in the instant case as a G9 lamp and whose lamp cylinder 23 supports a socket 24 with socket contacts 25 at end of the lamp body that is oriented towards the socket base 12.

A light glass 26 forms an annular neck 27 at a lower end oriented towards the socket base 12 wherein the neck 27 envelops a receiving opening 28 configured to receive the lamp 22 and supports attachment devices 29 at an outer circumference.

The lamp glass 26 is fixed by the attachment ring 17 at the lamp socket 11. The light glass 26 forms an upper end of the oven light 10, the socket 11 forms the lower end of the oven light 10, wherein a geometric center axis LM is run top down, thus vertically through the oven light 10.

Figure 2:
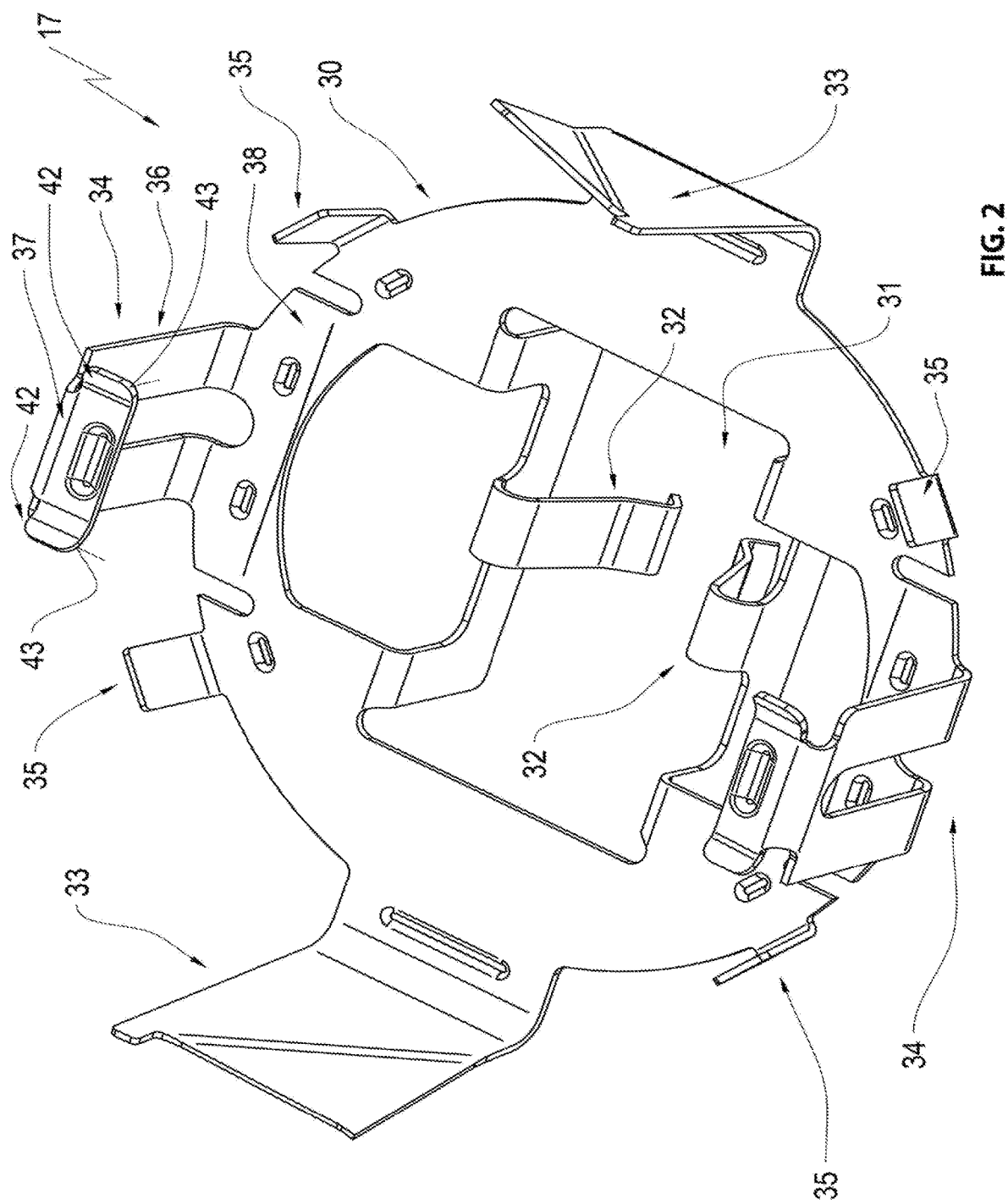
FIG. 2. illustrates an attachment ring of the cooking appliance lamp in FIG. 1 in a perspective view.
Figure 3:
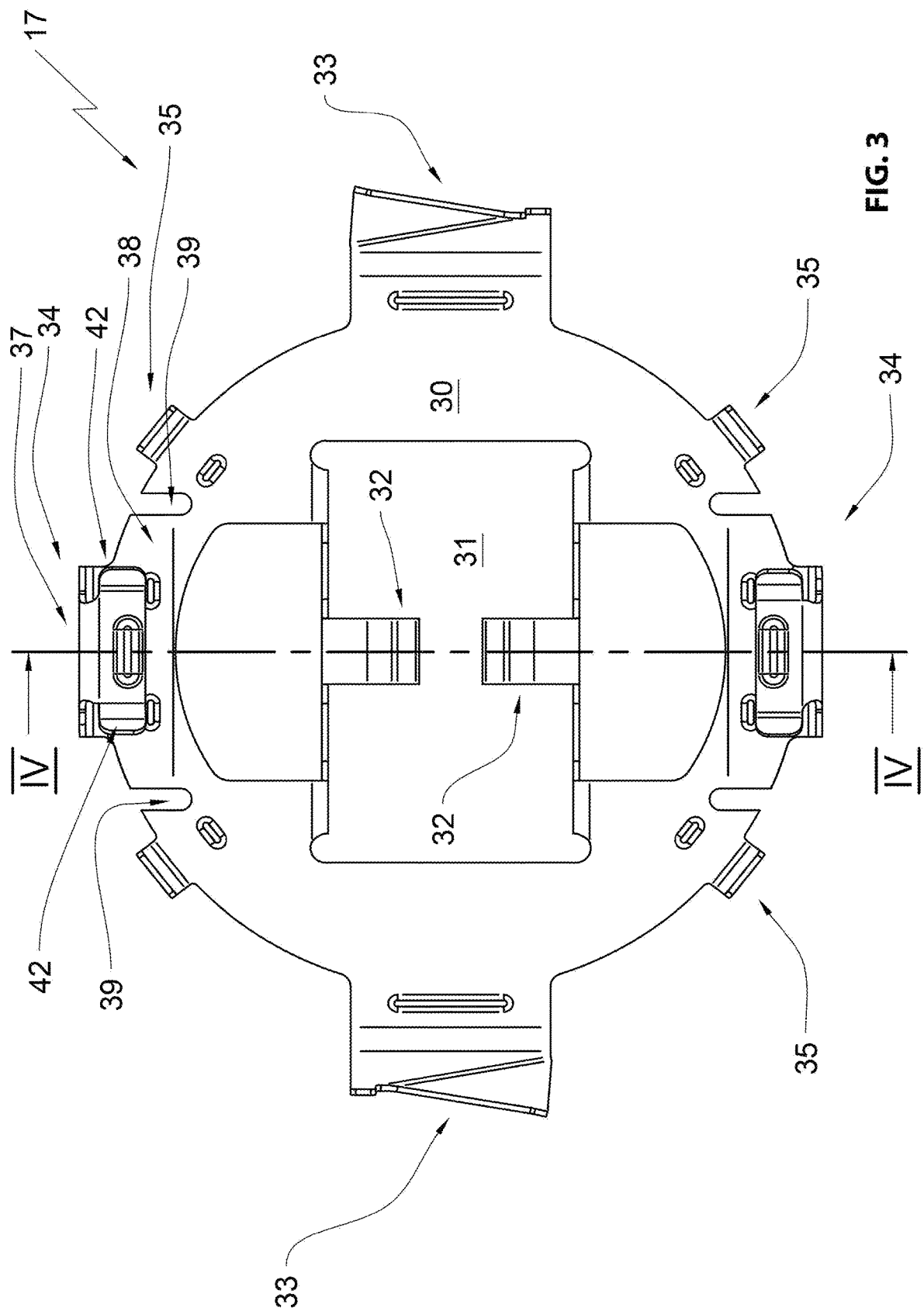
FIG. 3 illustrates the attachment ring according to FIG. 1 in a top view.
Figure 4:
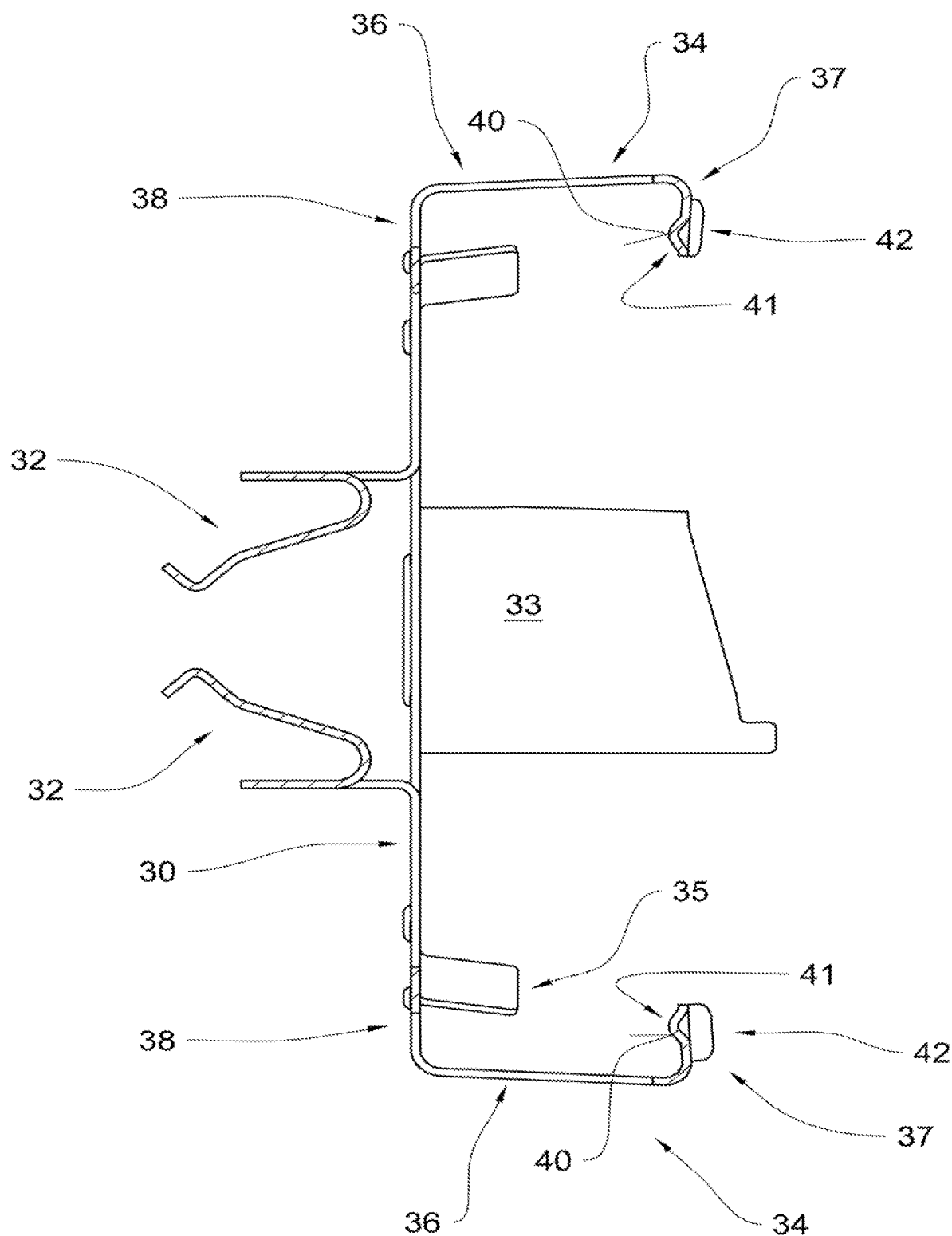
FIG. 4 illustrates the attachment ring according to FIG. 2 according to sectional line IV-IV in FIG. 3.

FIGS. 2-4 illustrate the attachment ring 17 in different views, namely in a perspective view from above, c.f. FIG. 2, in a top view c.f. FIG. 3 and in a sectional view according to sectional line IV-IV in FIG. 3 (c.f. FIG. 4).

The attachment ring 17 includes a base 30 which is a flat annular metal component that is configured with a plurality of functional elements. The base 30 forms a center socket cut out 31 wherein the lamp socket 24 runs through the socket receiver and wherein retaining springs 32 engage the socket cut out and support the socket 24 in the socket base. Diametrically opposed interlocking springs 33 fix the socket base 12 and thus the oven light 10 at a wall of a cooking appliance by receiving a wall section between themselves and the retaining flange 21. The attachment ring 17 includes two attachment brackets that are diametrically opposed and provided overall with the reference numeral 34 configured to attach the light glass 26 at the socket base 12 in a disengageable manner.

Support lobes 35 arranged at an outer circumference of the base 30 fix the attachment ring 17 at an inner surface of the annular wall 19 of the socket base 12.

Each attachment bracket 34 includes a spring arm 36 that extends from the base 30 parallel to the longitudinal center axis LM, thus essentially vertically. The spring arm 36 supports a locking bar 37 at an end of the spring arm 36 that is oriented away from the base 30, wherein the locking bar is horizontally oriented and radially inward oriented thus oriented in a direction of the longitudinal center axis LM.

The end of the spring arm 36 that is proximal to the base is attached at a leaf spring 38. This leaf spring 38 is provided by two incisions 39 in the base 30, wherein the two incisions 39 are arranged on both sides of the spring arm 36 and oriented parallel to one another. The attachment ring 17 that is made from a spring elastic piece of sheet metal is a stamped component and provides a spring elastic deflection of the locking bar 37 and of the leaf spring 38 in the axial direction in a portion of the attachment bracket 34 whereas the spring arm 36 is displaceable in the radial direction.

The locking bar 37 forms a locking bar surface 40 that is oriented downward in a direction of the base 30, wherein a support lobe originates from the locking bar surface 40 axially in a direction towards the base 30, thus in a downward direction. This support cam 41 is embossed into the locking bar 37.

The free ends of the locking bar 37 that are oriented in the circumferential direction are configured as lobes 42 and separated by an incision from the spring arm 36. Thus, the lobes 42 can be deflected in an axially upward direction, thus in a direction towards the light glass 36 and therefore form slanted surfaces 43 oriented towards the base 30.

Figure 5:
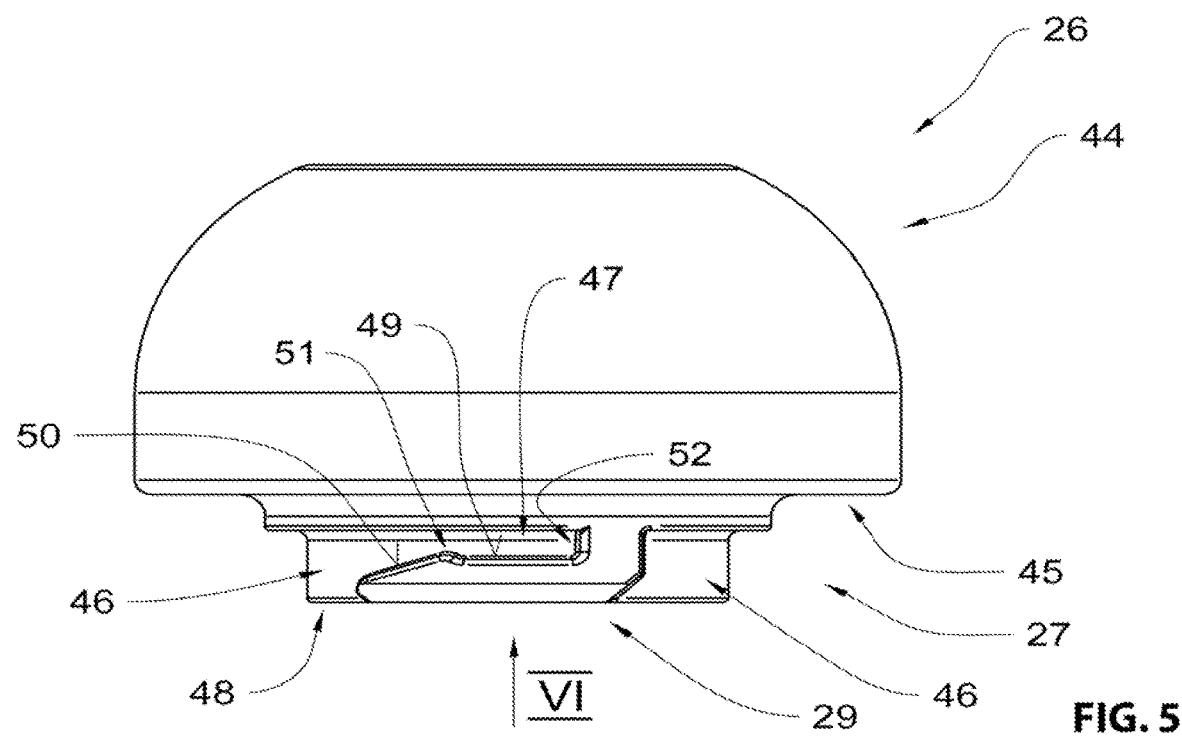
FIG. 5 illustrates a side view of the light glass of the cooking appliance light according to FIG. 1.

FIG. 5 shows the light glass 26 in a side view with a hood shaped cover 44 that is hollow inside and supports the neck 27 at a bottom side oriented towards the socket base 12. The neck 27 is reduced in circumference compared to the cover 44, so that a receiving flange 45 is in the step transition between the neck 27 and the cover 44.

The neck 27 includes an attachment device designated overall with reference numeral 29. The attachment device is formed by a vertical groove 36 introduced into the neck 27, wherein the vertical groove transitions into a horizontal groove 37 wherein both grooves 46, 47 are configured in the embodiment on the outer circumference of the neck 27 and configured open in a radially outward direction. The vertical groove 47 includes an axially oriented locking bar entry opening 48 so that the locking bar 37 can penetrate into the vertical groove 46 in an insertion movement X when placed onto the attachment ring 17 and is inserted into the horizontal groove 47 by a rotating movement Y.

The horizontal groove 47 is provided with a locking bar support surface 49 that is oriented axially upward thus towards the cover 44 wherein the locking bar support surface 49 includes a clamping bevel 50 in an entry portion of the horizontal groove 47 and an adjoining safety protrusion 51 that constricts the horizontal groove 47 in the axial direction. The horizontal groove 47 forms a movement stop 52 at a wall section at an end of the horizontal groove 47 that is oriented away from the vertical groove 46.

Figure 6:
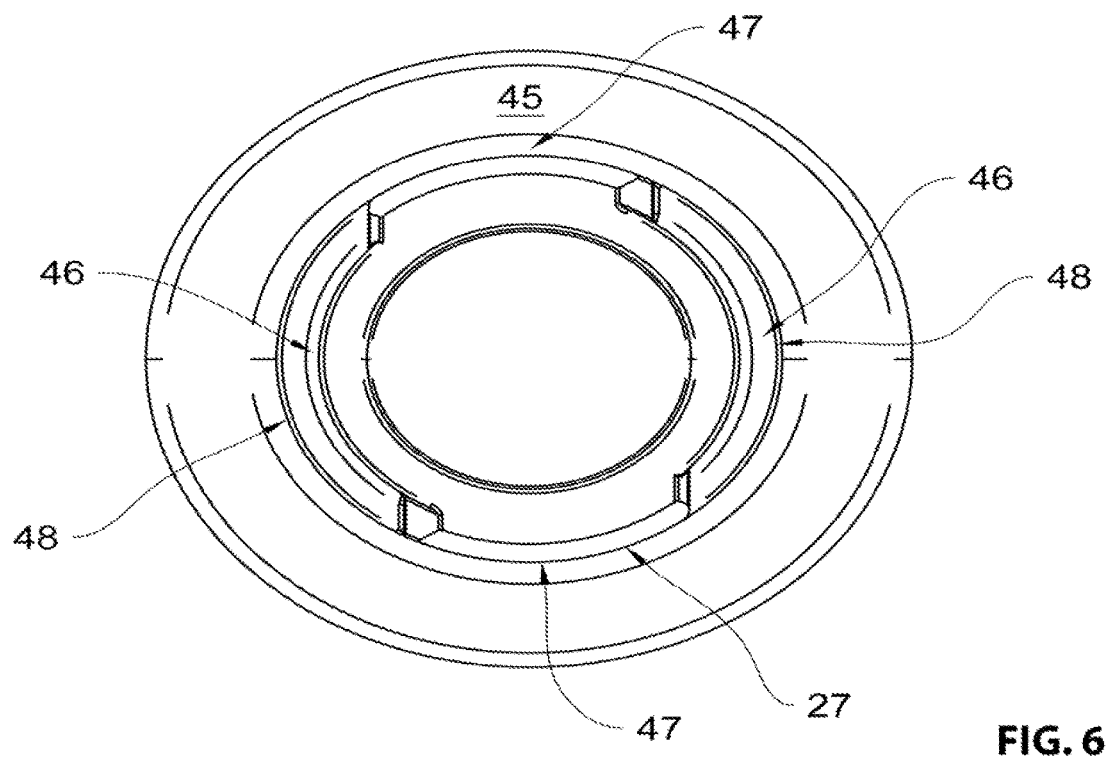
FIG. 6 illustrates a bottom view of the light glass according to FIG. 5 according to view arrow VI.

It is evident from FIG. 6 which is a view from below of the lamp glass 26 according to the view arrow VI in FIG. 5 that two diametrically opposed attachment devices 29 are arranged at the neck 27 of the lamp glass 26.

Figure 7:
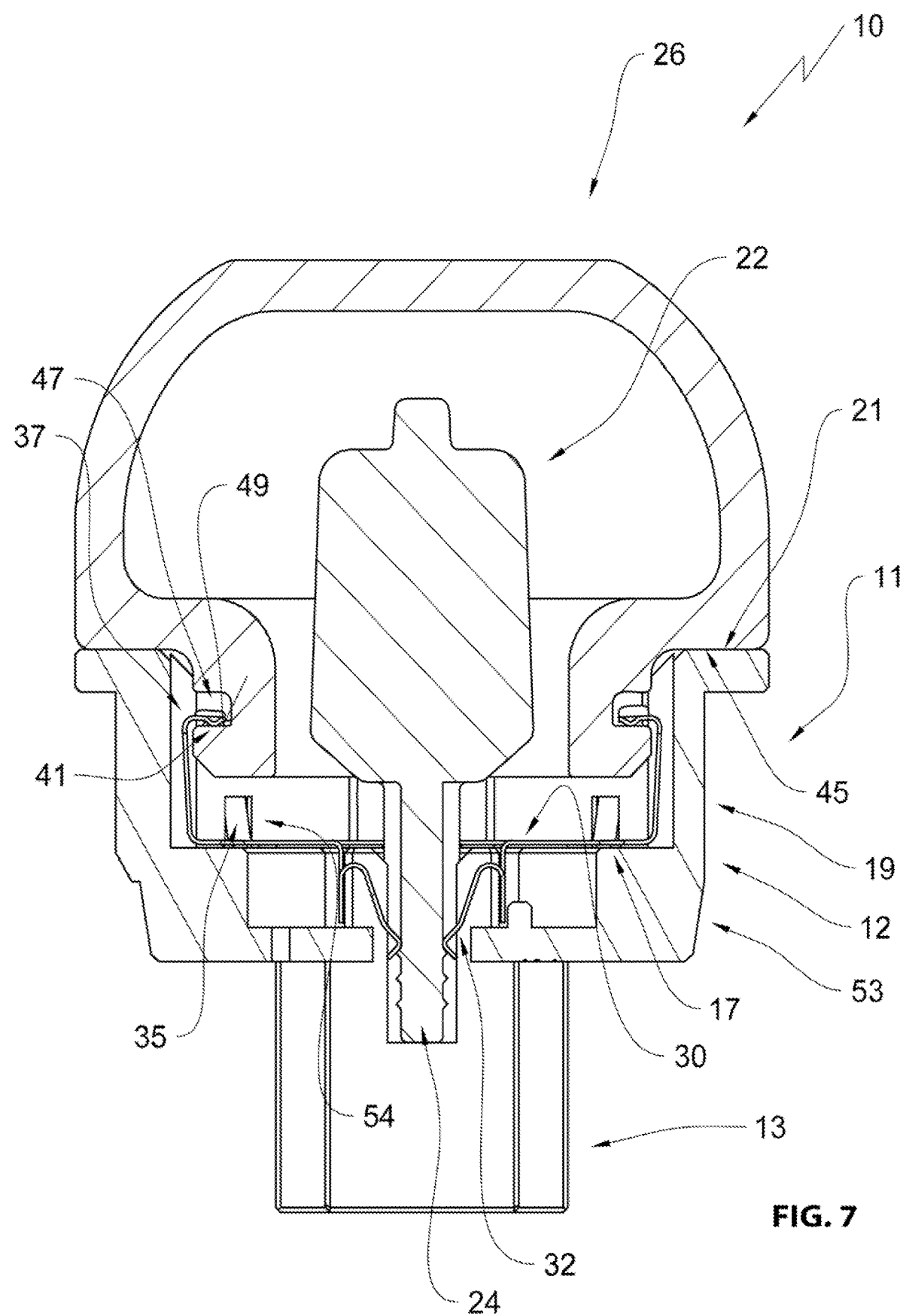
FIG. 7 illustrates a sectional view of the cooking appliance light according to according to FIG. 1.

FIG. 7 shows an axial sectional view of the oven light 10 in a standard configuration, wherein the position of the section line corresponds to the section through the attachment ring 17 according to section line IV-IV in FIG. 3.

It is evident from this illustration that the lamp socket 11, in particular the socket body 12, includes a socket base 53 which retains the studs 13 in a downward direction and on which the annular wall 19 that extends in a direction of the light glass 26 is supported. The orientation of the base 30 of the attachment ring 17 is parallel to the socket body, the attachment brackets 34, the interlocking springs 30 and the support lobes 35, however, extend essentially axially in a direction towards the lamp glass 26.

The annular wall 19 forms support bays 54 at an inner circumference wherein the support lobes 35 engage the support bays 54 and thus retain the attachment ring 17 at the socket body 12. The lamp 22 is arranged in the receiving cavity 18 of the socket body 12 and within the light glass 26, wherein the lamp socket 24 is inserted through the socket receiver 31 of the attachment ring 17 into the socket body 12 and anchored therein by the retaining spring 32.

It is furthermore evident from FIG. 7 that the locking bar 37 engages the horizontal grooves 47 in radially inward direction and only contacts the locking bar support surface 49 of the horizontal groove 47 with a support cam 41 of the locking bar 37. Thus, the locking bar 37 forms a punctiform or possibly linear contact surface at the locking bar support surface 49 depending on a configuration of the support cam 41. The substantial reduction of the contact surface between locking bar 37 and horizontal groove 47 reliably prevents an adhesion of the light glass 26 and the locking bar 37 through baking or caking.

FIG. 7 shows that the contact flange 45 of the light glass 26 contacts the support flange 21 of the socket body 12 reliably so that a penetration of cooking vapors between the light glass 26 and the socket body 12 is prevented reliably.

Figure 9:
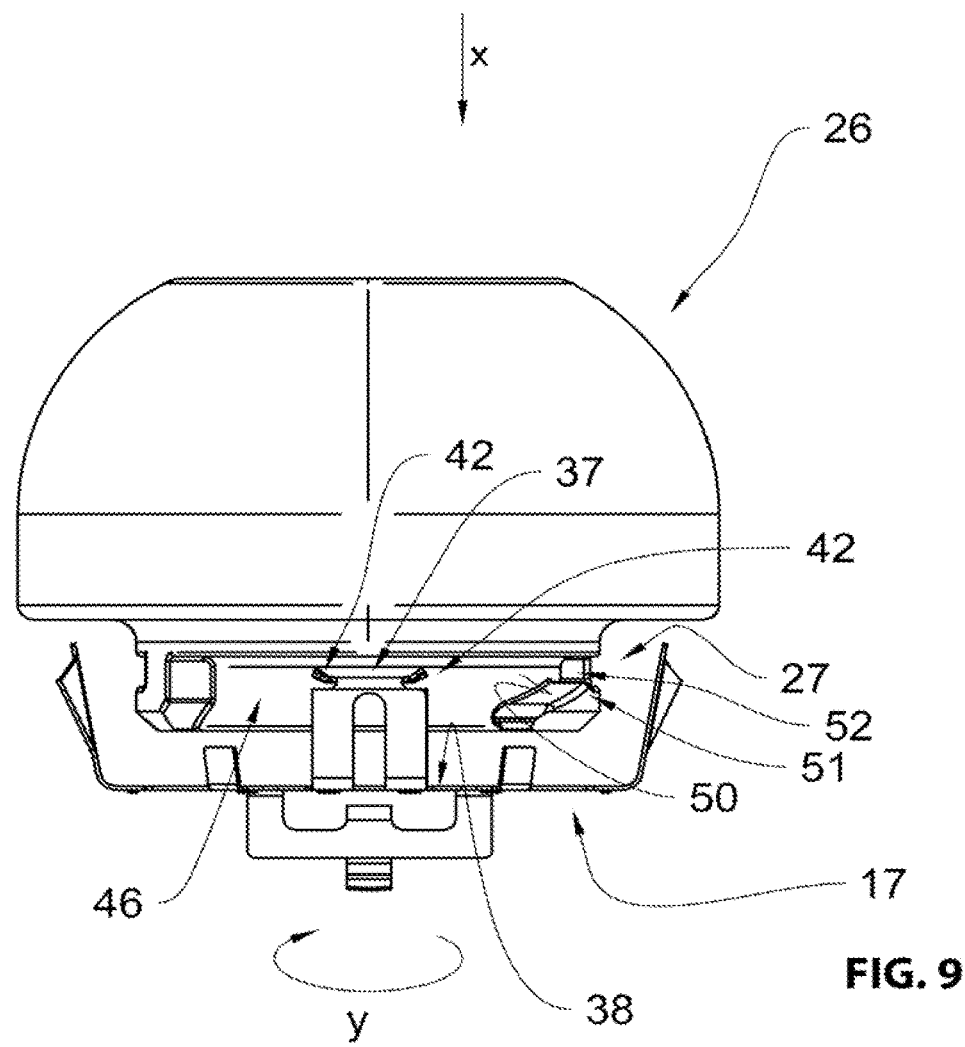
FIG. 9 illustrates a cooperation between the light glass and attachment ring in a first relative orientation.
Figure 10:
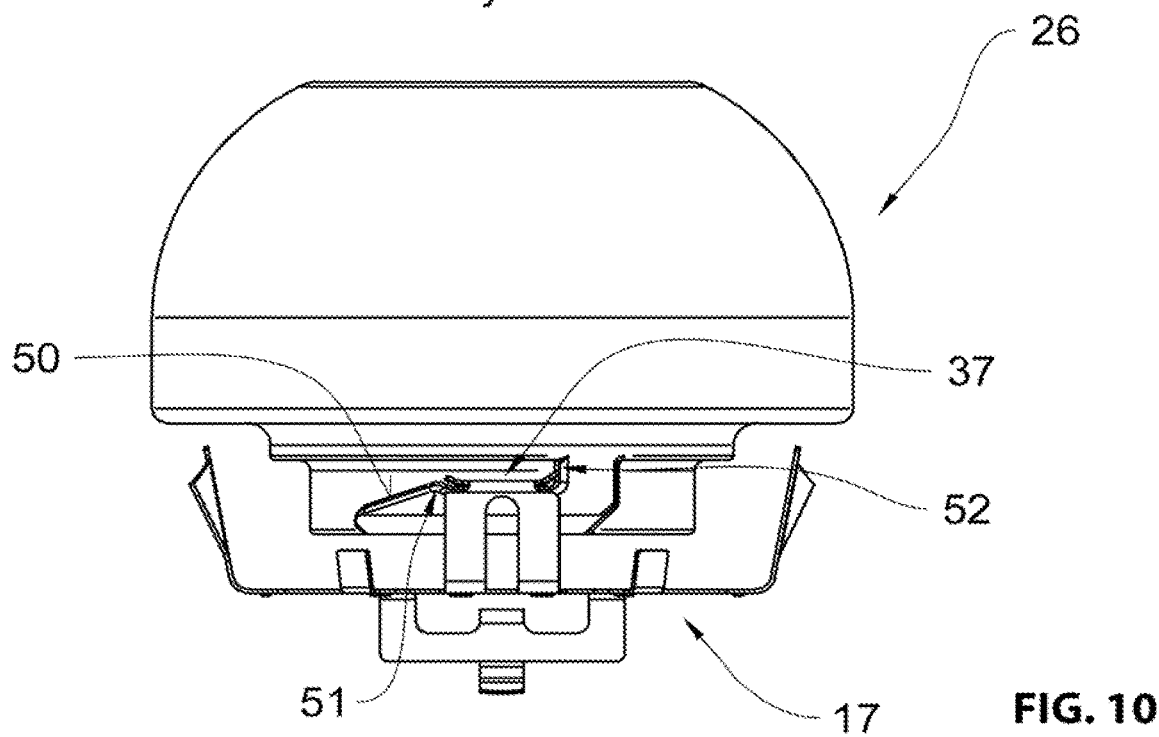
FIG. 10 illustrates a view of a cooperation of light glass and attachment ring in a second relative orientation.

FIGS. 9 and 10 illustrate an interaction of the attachment ring 17 and the light glass 26 of the oven light 10 configured to fix the light glass 26 at the socket body 12.

Initially the light glass 26 is moved in the insertion direction X towards the socket body 12, wherein the neck 27 is inserted through the insertion opening 20 of the annular wall 19 into the receiving cavity 18 of the socket body 12. Thus, the locking bar 37 is aligned with the vertical groove 46 and penetrates the vertical groove 46. The lobes 42 extending in the circumferential direction run in the subsequent movement according to arrow Y in the transition from FIG. 9 to FIG. 10 onto the clamping bevel 50 and slide on the clamping bevel 50 in order to minimize friction resistance. Thus, a spring elastic preloading at least of the locking bar 37 possibly also of the leaf spring 38 is performed which leads to a deflection of the locking bar 37 and of the leaf spring 38 in the vertical direction. The clamping bevel 50 that transitions into the safety protrusion 41 causes a lift over movement until the locking bar 37 is placed in a section of the horizontal groove 47 that is arranged between the safety protrusion 51 and the movement end stop 52 (c.f. FIG. 10). The built-up spring forces pull the light glass 26 towards the retaining flange 21 (c.f. FIG. 7). Thus, the light glass 26 contacts the socket flush.

Figure 8:
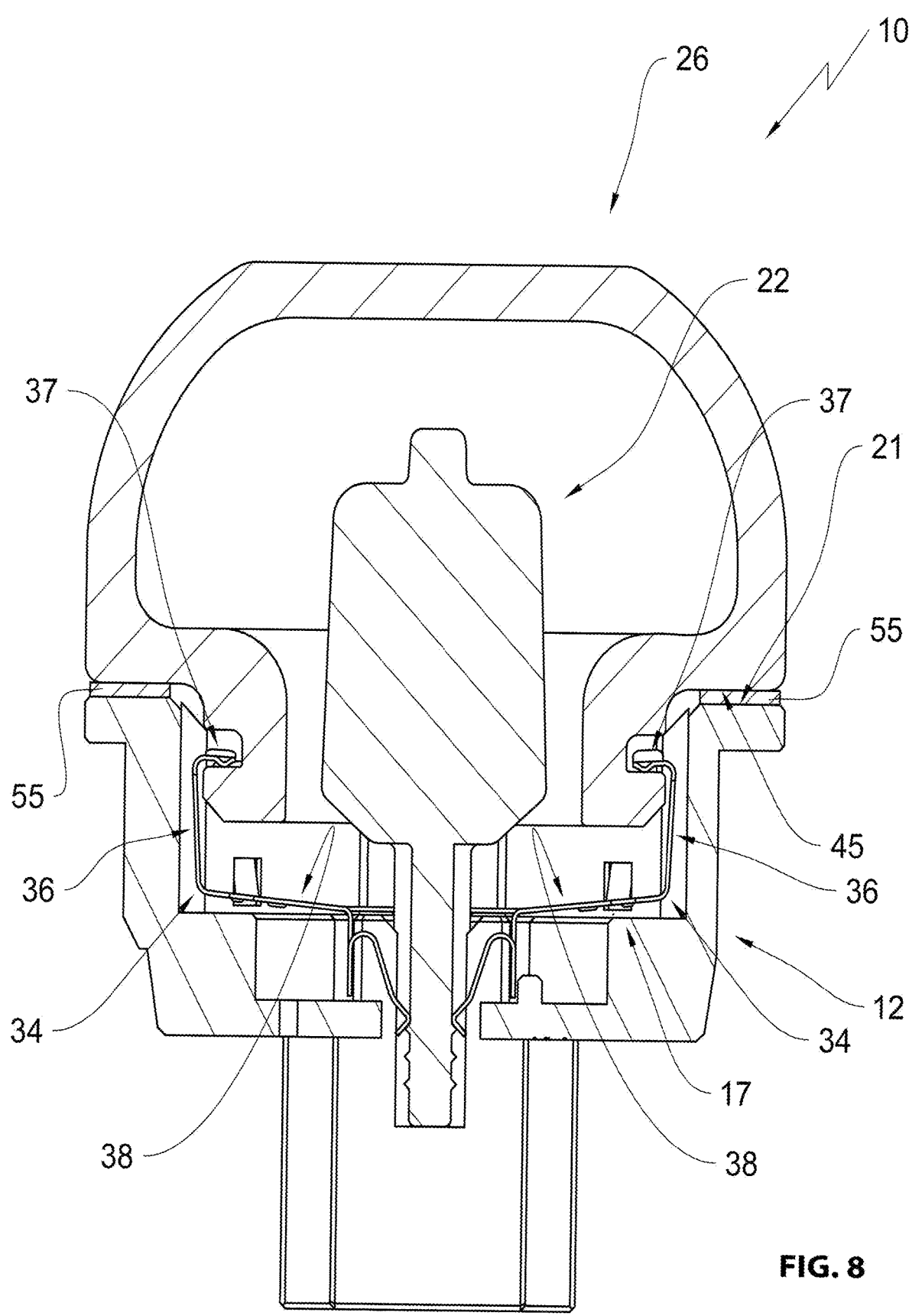
FIG. 8 illustrates the sectional view of FIG. 7 with a gasket arranged between the light glass and the light socket.

The combination of axially extendable locking bar 37 and axially extendable leaf spring 38 facilitates a large spring travel and thus a large amount of compensation of fabrication tolerances of the light glass 26 and the socket body 12. The large total spring travel of the attachment bracket 34 facilitates using the oven light 10 for particular applications as illustrated e.g. in FIG. 8. Thus, a sectional view analogous to FIG. 7 is selected, however a gasket 55 is arranged between the contact flange 45 of the light glass 26 and the retaining flange 21 of the socket body 12, wherein the gasket 55 has a defined thickness in the axial direction and thus offsets the light glass 26 from the socket body 12. FIG. 8 shows how the leaf springs 38 of the attachment brackets 34 of the attachment ring 17 are vertically displaced towards the light glass 26 in order to compensate for the axial distance between the light glass 26 and the socket body 12. The spring reset forces thus created retain the light glass 26 reliably at the socket body 12 and provide sufficient contact pressure of the contact flange 45 at the gasket 55 and additionally the necessary contact pressure between the gasket 55 and the retaining flange 21.

The essential advantage of the spring arrangement of the leaf spring 38, the locking bar 37 and the spring arm 36 is furthermore found in that gasket arrangements can be provided between the socket body 12 and the light glass 26 in addition to making up for greater fabrication tolerances without having to change the design of the oven light 10. These gasket packets are useful wherever a large amount of cooking vapors is present. In addition to ovens, in particular commercial ovens these lights are used with a gasket arrangement according to FIG. 8 in steam cookers that have a lot of humidity in the cooking cavity.

Overall, the invention provides an advantageous oven light 10 which facilitates a simplified configuration of the light glass 26 or the attachment devices 29 formed by the light glass 26 over the generic oven lights recited supra. Thus, axially acting locking bars are being used instead of radially acting locking bars. In order to reduce a contact area between the attachment devices 29 and the attachment elements 34 of the light glass 26 and the socket 11, it is proposed to provide the locking bar 37 with a support cam 41 that is oriented in a direction towards the locking bar support surface 49. This way an adhesion through caking between the attachment bracket 34 at the socket 11 and the attachment device 29 at the light glass 26 is reliably prevented.

A substantial advantage of the cooking appliance light according to the invention can be found in the configuration of the attachment bracket 34 of the lamp socket 11. The combination of vertically displaceable leaf spring 38 and vertically displaceable locking bar 37 facilitates bridging acceptable large axial tolerances between the light glass 26 and the socket body 12. The axial tolerances can be within the fabrication tolerances, however, they also facilitate an insertion of gasket packets between the light glass 26 and the socket body 12 without having to adjust the oven light configuration.

Thus, the radially deflectable spring arm 36 is helpful for extreme axial tolerances in order to bridge the axial distance between the lamp glass 26 and the socket body 12. When bridging a larger axial distance than required for the gasket packet 55 in FIG. 8 which cannot be compensated by axially deflecting the leaf spring 38 and the locking bar 37, a radial displacement of the spring arm can provide further axial clearance.

REFERENCE NUMERALS AND DESIGNATIONS 10 oven light
11 light socket
12 socket body
13 stand off
14 socket contact
15 connection contact
16 ground conductor contact
17 attachment ring
18 receiving cavity
19 annular wall
20 insertion opening
21 retaining flange
22 lamp
23 lamp cylinder
24 socket
25 socket contact
26 light glass
27 neck
28 receiving opening
29 attachment device
30 base
31 socket cut out
32 retaining spring
33 interlocking spring
34 attachment bracket
35 support lobe
36 spring arm
37 locking bar
38 leaf spring
39 incision
40 locking bar surface
41 support cam
42 lobe
43 slanted surface
44 cover
45 receiving flange
46 vertical groove
47 horizontal groove
48 locking bar entry opening
49 locking bar support surface
50 clamping bevel
51 safety protrusion
52 movement end stop
53 socket base
54 retaining bay
55 gasket
LM longitudinal center axis
X insertion direction
Y rotating movement

What is claimed is:

1. A cooking appliance light, comprising:
a light glass arranged at a top side of the cooking appliance light;
a socket arranged at a bottom side of the cooking appliance light, wherein a geometric center axis of the cooking appliance light runs vertically through the socket;
a neck arranged at a bottom side of the light glass, the neck including at least one groove arrangement including an axially extending vertical groove and an adjoining circumferentially extending horizontal groove wherein the axially extending vertical groove and the circumferentially extending horizontal groove are radially open and engageable by a locking bar,
wherein the axially extending vertical groove includes an axially oriented locking bar entry opening,
wherein the circumferentially extending horizontal groove includes an axially upward oriented locking bar support surface including a safety protrusion and a movement stop at an end that is distal from the axially extending vertical groove;
an attachment bracket forming the locking bar that is fixed at the socket and that radially engages the groove arrangement after performing an insertion and rotation movement so that the light glass is attached at the socket; and
a contact flange that is part of the socket and in contact with the light glass,
wherein the attachment bracket includes a spring arrangement that supports the locking bar;

wherein the locking bar includes an axially downward oriented locking bar surface that contacts the axially upward oriented locking bar support surface, wherein the spring arrangement imparts an axially downward force upon the light glass that retains the light glass at the contact flange.

2. The cooking appliance light according to claim 1, wherein the locking bar forms a support cam that protrudes axially downward towards the axially upward oriented locking bar support surface.

3. The cooking appliance light according to claim 1, wherein a safety protrusion forms a threshold that rises axially upward from the locking bar support surface, wherein the locking bar is provided with slanted surfaces at circumferentially oriented ends, and wherein the slanted surfaces are oriented towards the locking bar support surface and sloped from the circumferentially oriented ends towards the locking bar support surface.

4. The cooking appliance light according to claim 1, wherein the spring arm forms part of the attachment element and includes the locking bar at a first end and is connected at a leaf spring with a second end, and wherein the leaf spring is deflectable axially to build up spring tension and facilitates an axial displacement of the locking bar arranged at the spring arm.

5. The cooking appliance light according to claim 4, wherein the socket forms an annular wall on a horizontally oriented socket base, and wherein the annular wall defines a receiving cavity and includes at least one receiving groove configured to receive the spring arm of the attachment bracket into which the spring arm is inserted with a radial clearance.

6. The cooking appliance light according to claim 4, wherein the leaf spring, the spring arm and the locking arm form the spring arrangement made from one piece of spring elastic sheet metal including:

the radially oriented and axially deflecting leaf spring, the radially oriented and axially spring elastic locking bar, and the axially oriented and radially spring elastic spring arm.

7. The cooking appliance light according to claim 5, wherein the attachment bracket is fixed at the socket by the leaf spring.

8. The cooking appliance light according to claim 7, wherein the leaf spring forms part of an attachment ring that is arranged within the receiving cavity and fixed at the annular wall or at the socket base.

* * * * *